Figure 1:
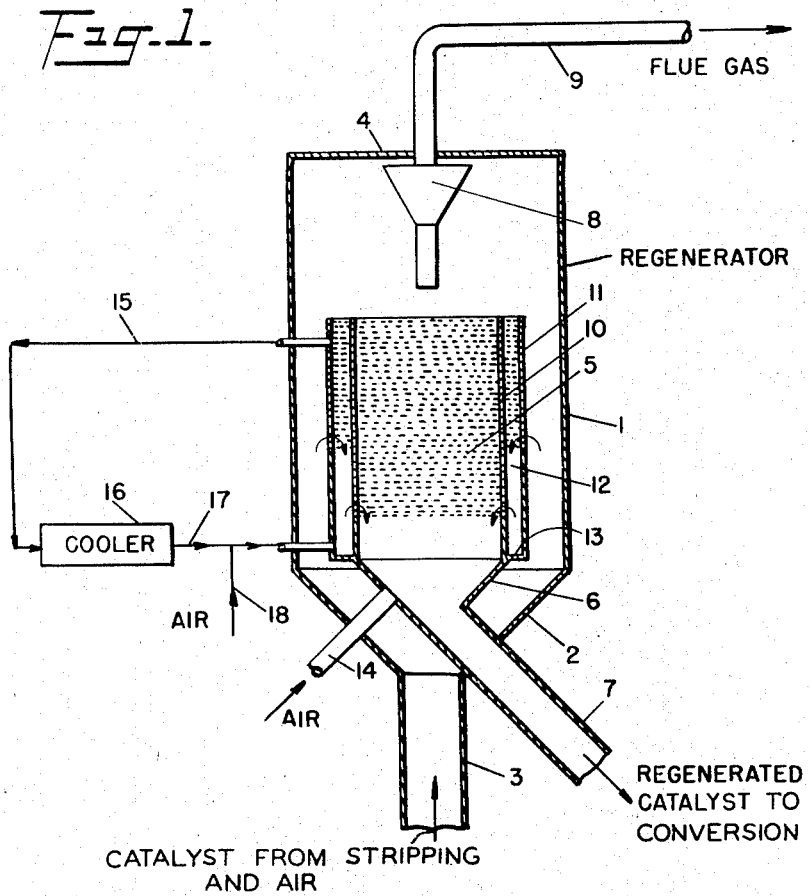

July 26, 1949.   H. L. PELZER   2,477,345
PROCESS AND APPARATUS FOR THE REGENERATION
OF HYDROCARBON CONVERSION CATALYST
Filed June 11, 1947   2 Sheets-Sheet 1

INVENTOR.
HARRY LOUIS PELZER
BY
Pennie, Edmonds, Morton & Barrows
ATTORNEYS

Patented July 26, 1949

2,477,345

UNITED STATES PATENT OFFICE 2,477,345

PROCESS AND APPARATUS FOR THE REGENERATION OF HYDROCARBON CONVERSION CATALYST

Harry Louis Pelzer, Steger, Ill., assignor to Sinclair Refining Company, New York, N. Y., a corporation of Maine Application June 11, 1947, Serial No. 754,017

4 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in the charge oil passing to a reactor in which conversion of the oil occurs and in which spent catalyst is separated from the oil vapors, the separated catalyst stripped of oil, regenerated by the burning-off of the coke or carbon deposited thereon during the reaction and the regenerated catalyst again suspended in the stream of charge oil passing to the reactor. Operations of the type described are commonly designated fluid catalyst processes.

In conventional operations, as just noted, the spent catalyst is passed from the reaction zone, stripped of oil and regenerated. Regeneration is usually effected in a large vertically elongated chamber in which the catalyst in a fluidized state is blown with air, while at an elevated temperature, resulting in the burning from the catalyst of the carbonaceous deposit.

The catalyst is ordinarily conveyed from the reactor, or from the stripping zone, to the regenerator in suspension in the regenerating air, the suspension entering the regenerator at its lower end, products of combustion being withdrawn from the upper end of the regenerator.

There is normally maintained in the regenerator a relatively thick bed of the catalyst as a so-called "high density" or "dense phase" fluidized body through which the regenerating air passes and which is kept in a general state of turbulence by the rising air and resultant combustion gases.

A very considerable amount of heat is liberated by the combustion of the carbonaceous deposit and in order to avoid overheating the catalyst, it has been proposed to withdraw continuously from the regenerating zone a portion of the hot catalyst which is then cooled, usually by passing through a waste heat boiler, and returned to the regenerator.

A difficulty previously experienced in operations of this type, has been the return to the reaction zone of catalyst which has been only partially regenerated and also the retention in the regenerating zone of catalyst after it has been completely regenerated. These defects have materially reduced the efficiency of the operation, catalyst life and over-all catalytic activity.

My present invention provides an improved method of operation of processes of the type described wherein these difficulties heretofore experienced are minimized. The invention also provides an improved apparatus especially adapted to the carrying out of the process.

In accordance with my present invention, the regeneration of the catalyst is initiated in one zone and the regeneration completed in a second zone completely enclosed within the first zone, the inner zone being in open communication at its upper end with the outer zone and separated throughout its height from the outer zone by a third annular zone, delineated by coaxially positioned cylindrical partitions dividing the regenerating chamber into an inner cylindrical zone, an intermediate annular zone and an outer annular zone. The cylindrical partitions are perforated over at least a portion of their height so as to permit the flow of catalyst progressively from the outer annular zone through the perforations into the inner cylindrical zone. It is particularly advantageous that the outer partition be perforated over its upper half only and that the perforated portion of the inner partition extend from the upper end to just short of the lower end of the partition.

The catalyst in suspension in about 50% of the air required for regeneration is passed into the lower end of the outer annular zone wherein the regeneration is initiated. The catalyst tends to drop out of suspension in this annular zone forming a dense phase body of catalyst therein, maintained fluidized by the rising air and gaseous products of combustion. The catalyst accumulating in the bed moves through the outer perforated partition into the intermediate annular zone and, from thence, through the inner perforated partition into the inner, secondary zone of regeneration.

A very substantial amount of heat is liberated by the burning off of the carbonaceous deposit from the catalyst and, frequently, unless heat is extracted from the catalyst undergoing regeneration, the temperature becomes excessive and the catalyst is thereby detrimentally affected.

In order to prevent excessive temperature rise and also further to promote the uniform regeneration of the catalyst, I withdraw a portion of the catalyst from the intermediate annular zone, cool the withdrawn catalyst, for instance, by passing it through a waste heat boiler, and return the cooled catalyst to the intermediate annular zone in suspension in secondary regenerating air. For this purpose, I use about 25% of the total air required for regeneration.

The partially regenerated catalyst accumulating in the inner, cylindrical zone gravitates downwardly therethrough in contact with a rising current of additional secondary air, introduced into the lower portion of the inner zone and thereby residual carbon is burned from the catalyst.

By the process described, the catalyst in the respective zones is in heat exchange relation and also gaseous media is free to pass from each zone to the adjacent zone resulting in a more uniform temperature and pressure conditions throughout the regenerating chamber while retarding indiscriminate mixing of the catalyst in various stages of regeneration.

Products of combustion from the primary regenerating zone are, in my process, separated, for the most part, from the catalyst prior to its introduction to the secondary regenerating zone, in which the catalyst is brought into contact with fresh secondary air, substantially undiluted by products of combustion from the initial stage of the regeneration. A more complete and uniform regeneration of the catalyst is thereby effected.

In the procedure just described, the proportions of the total regenerating air introduced into the respective zones afford particularly desirable results. However, it will be understood that some deviation from the particular proportions designated is permissible.

Figure 2:
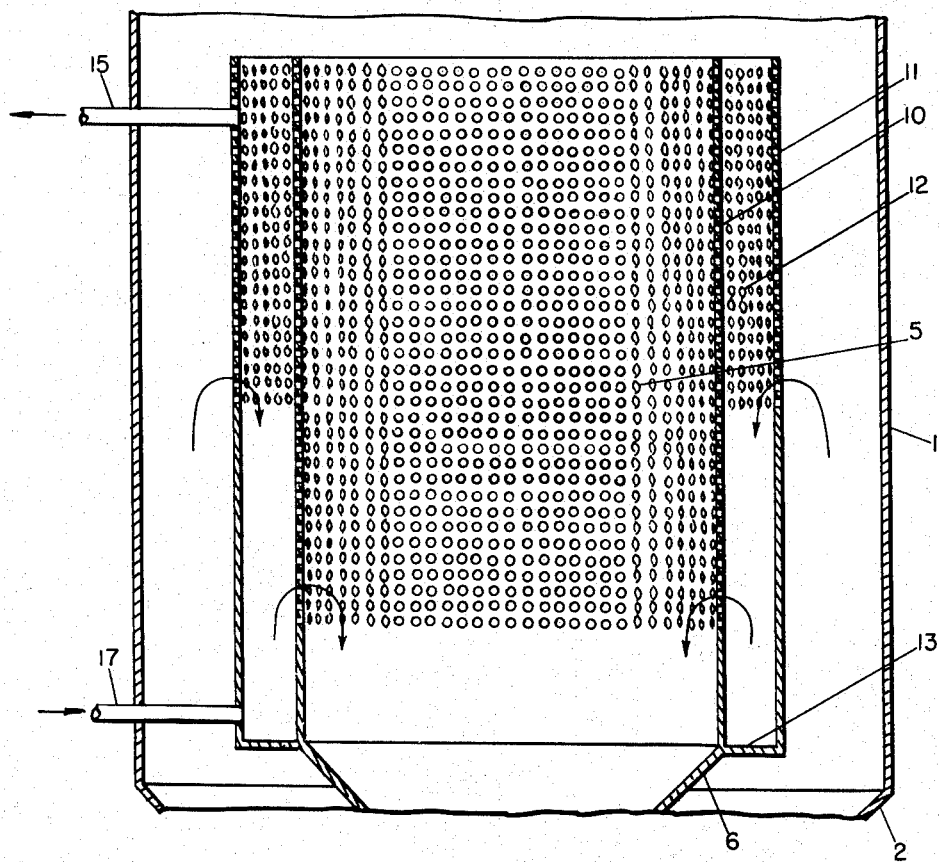

The invention will be further described and illustrated with reference to the accompanying drawings Figure 1 of which represents conventionally and somewhat diagrammatically a particularly advantageous embodiment of my invention. Figure 2 is a somewhat enlarged fragmentary view showing the perforated partitions which delineate the intermediate annular zone.

The apparatus indicated by the reference numeral 1 in the accompanying drawing represents a generally cylindrical vertically elongated chamber, the lower end of which is generally conical, as indicated at 2, and terminates in a conduit 3. The chamber 1 is enclosed at its upper end by cover plate 4. Coaxially positioned within the chamber 1 is a second chamber 5 also generally cylindrical and terminating at its lower end in a conical lower portion, as indicated at 6, and opening into conduit 7. The inner chamber 5 is open at its upper end and, as indicated in the drawing, is substantially shorter than the chamber 1. Positioned in the upper portion of the chamber is a cyclone type separator, diagrammatically indicated at 8, which is connected with conduit 9 for carrying off the effluent flue gases.

The cylindrical partition 10 of chamber 5 is surrounded by a second coaxially positioned cylinder 11 spaced therefrom so as to form an annular chamber 12 opening at its upper end into the outer chamber and closed at its lower end by annular plate 13.

The cylindrical walls 10 and 11 are fabricated from metal plate, or the like, perforated as indicated in the drawing, so as to permit the passage of the catalyst from the outer annular chamber into the intermediate annular chamber and, from thence, into the innermost chamber 5.

A conduit 14, adapted to the introduction of air, leads to the lower portion of the inner chamber 5. This conduit is, with advantage, in the form of a bustle pipe, or is otherwise adapted to distribute the air uniformly throughout the descending body of catalyst.

The upper portion of the annular zone 12 is connected by conduit 15 with the inlet end of cooler 16 of conventional type, for instance, a waste heat boiler, the outlet end of the cooler being connected with the lower portion of the annular zone 12 by conduit 17. The connection 18 is provided for injecting air into conduit 17.

In operation, spent catalyst from the reaction or stripping zone is passed in suspension in air through conduit 3 into the lower portion of the primary regeneration zone in which regeneration of the catalyst is initiated. The body of catalyst accumulating in the outer annular zone gradually works its way through the perforated partition 11 into the intermediate annular zone 12 and, from thence, through the perforations in partition 10 into the inner zone 5. The body of catalyst accumulating in zone 5 gravitates downwardly therethrough in contact with the rising current of secondary air introduced into the lower end of said zone through conduit 14 and residual carbon is thereby burned from the catalyst. Upon reaching the lower end of the zone 5 the catalyst is withdrawn through conduit 7 and is returned to the reaction zone.

In order to avoid overheating the catalyst undergoing regeneration, a portion of the catalyst is withdrawn from the upper portion of the annular zone 12 through conduit 15 to cooler 16 in which heat is extracted from the catalyst by a cooling medium, the catalyst being returned to the lower end of zone 12 through conduit 17 in suspension in additional air introduced through line 18.

Products of combustion from the respective zones are combined in the upper portion of the outer chamber 1 and passed through separator 8, for the removal of suspended catalyst, and, from thence, through conduit 9 to a precipitator, or stack, not shown.

The total amount of regenerating air will, of course, depend upon the amount of carbonaceous material to be burned from the catalyst. Contrary to conventional operation, as previously noted, only a portion of the regenerating air is introduced into the zone of primary regeneration, advantageously only about 50% of the total regenerating air being introduced with the catalyst through conduit 3. Secondary regenerating air, advantageously about 25% of the total, is introduced through conduit 14 and the remainder of the air required is introduced through line 18.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of feed stock used, the particular catalyst employed and the reaction desired.

The invention contemplates the use of known methods and means for contacting the hydrocarbon vapors to be converted with the catalyst and for stripping and conveying the catalyst through the system. In cracking gas oil, for instance, the reaction temperature may, with advantage, be within the range of 800° to 1,000° F. and the pressure at the top of the reactor within the range of 5 to 25 pounds per square inch. The temperature of the catalyst undergoing regeneration may, with advantage, be maintained within the range of 950° to 1,200° F., temperatures above this range being avoided by the means just described.

It will be understood that the invention is not restricted with respect to the particular type of fluid catalyst conversion processes but is applicable to various modifications of fluid catalyst processes in which the catalyst in finely divided form is intermittently regenerated by the burning off of carbonaceous deposits and the regenerated catalysts returned to the zone of hydrocarbon conversion.

I claim:

1. In a fluid catalyst process for the conversion of hydrocarbons wherein a finely divided catalyst at an elevated temperature is repeatedly brought into intimate contact with hydrocarbon vapors to be converted in a conversion zone, spent catalyst is withdrawn from the conversion zone, stripped of readily vaporizable hydrocarbons, the stripped catalyst conveyed in fluid suspension to a regenerating zone in which the catalyst in a dense phase fluidized body is regenerated by the burning off of carbon deposits, formed thereon during the conversion, by the passage of air in contact therewith and from which the regenerated catalyst is returned to the conversion zone, the improvement in the regeneration of the catalyst which comprises passing the catalyst progressively through an outer annular zone, an intermediate annular zone and an inner cylindrical zone, the three zones being coaxially positioned and in open communication at their upper ends, passing the catalyst in suspension in 50% of the air required for regeneration into the lower end of the outer annular zone, withdrawing catalyst from the lower end of the inner cylindrical zone for return to the hydrocarbon conversion zone, preventing excessive temperature rise in the body of catalyst undergoing regeneration by withdrawing hot catalyst from the intermediate annular zone, cooling the withdrawn catalyst and returning it to the intermediate annular zone in suspension in about 25% of the air required for regeneration, passing the remainder of the air required for regeneration into the lower end of the inner cylindrical zone and upwardly therethrough in contact with the catalyst.

2. In a fluid catalyst process for the conversion of hydrocarbons wherein a finely divided catalyst at an elevated temperature is repeatedly brought into intimate contact with hydrocarbon vapors to be converted in a conversion zone, spent catalyst is withdrawn from the conversion zone, stripped of readily vaporizable hydrocarbons, the stripped catalyst conveyed in fluid suspension to a regenerating zone in which the catalyst in a dense phase fluidized body is regenerated by the burning off of carbon deposits, formed thereon during the conversion, by the passage of air in contact therewith and from which the regenerated catalyst is returned to the conversion zone, the improvement in the regeneration of the catalyst which comprises passing the catalyst progressively through an outer annular zone, an intermediate annular zone and an inner cylindrical zone, the 3 zones being coaxially positioned and in open communication at their upper ends, passing the catalyst in suspension in 50% of the air required for regeneration into the lower end of the outer annular zone, withdrawing catalyst from the lower end of the inner cylindrical zone for return to the hydrocarbon conversion zone, preventing excessive temperature rise in the body of catalyst undergoing regeneration by withdrawing hot catalyst from the upper portion of the intermediate annular zone, cooling the withdrawn catalyst and returning it to the lower portion of the intermediate annular zone in suspension in about 25% of the air required for regeneration, passing the remainder of the air required for regeneration into the lower end of the inner cylindrical zone and upwardly therethrough in contact with the catalyst.

3. Apparatus of the type described comprising a vertically elongated cylindrical chamber closed at its upper end, a second vertically elongated chamber coaxially positioned within the first chamber, having cylindrical side walls perforated over a substantial portion of their height and in open communication at its upper end with the first said chamber, a coaxially positioned annular chamber surrounding the inner chamber, substantially co-extensive in height therewith, closed at its lower end, in open communication at its upper end with the first said chamber and having a cylindrical side wall perforated over a substantial proportion of its height, the respective chambers being so constructed and arranged as to constitute an inner cylindrical chamber, an outer annular chamber and an intermediate annular chamber, a conduit leading into the lower portion of the outer annular chamber, a conduit leading from the lower portion of the inner cylindrical chamber, conduit means for injecting air into the lower portion of the inner cylindrical chamber, conduit means adapted to the withdrawal of flue gases from the upper portion of the outer chamber, a cooler, conduit means leading from the intermediate annular chamber to the cooler, conduit means leading from the cooler back to the intermediate annular chamber, and a connection adapted to the introduction of air into the last said conduit.

4. Apparatus of the type described comprising a vertically elongated cylindrical chamber closed at its upper end, a second vertically elongated chamber coaxially positioned within the first chamber, having cylindrical side walls perforated over a substantial portion of their height and in open communication at its upper end with the first said chamber, a coaxially positioned annular chamber surrounding the inner chamber substantially co-extensive in height therewith, closed at its lower end, in open communication at its upper end with the first said chamber and having a cylindrical side wall perforated over a substantial proportion of its height, the respective chambers being so constructed and arranged as to constitute an inner cylindrical chamber, an outer annular chamber and an intermediate annular chamber, a conduit leading into the lower portion of the outer annular chamber, a conduit leading from the lower portion of the inner cylindrical chamber, conduit means for injecting air into the lower portion of the inner cylindrical chamber, conduit means adapted to the withdrawal of flue gases from the upper portion of the outer chamber, a cooler, conduit means leading from the upper portion of the intermediate annular chamber to the cooler, conduit means leading from the cooler back to the lower portion of the intermediate annular chamber, and a connection adapted to the introduction of air into the last said conduit.

HARRY LOUIS PELZER.

REFERENCES CITED

The following references are of record in the file of this patent:

UNITED STATES PATENTS

| Number | Name | Date |
| --- | --- | --- |
| 2,337,684 | Scheineman | Dec. 28, 1943 |
| 2,394,710 | McAfee | Feb. 12, 1946 |
| 2,401,739 | Johnson | June 11, 1946 |
| 2,422,262 | Russell | June 17, 1947 |